United States Patent
Virdee et al.

(10) Patent No.: US 6,198,753 B1
(45) Date of Patent: Mar. 6, 2001

(54) METHOD AND APPARATUS FOR FACILITATING AN INTERFACE TO A DIGITAL SIGNAL PROCESSOR

(75) Inventors: Harbhajan S. Virdee, Richardson; Thomas M. Kaplan, Allen, both of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/858,993

(22) Filed: May 20, 1997

(51) Int. Cl.[7] .................................................. H04J 3/06

(52) U.S. Cl. ........................................... 370/509; 370/522

(58) Field of Search ................................. 370/503, 505, 370/509, 510, 511, 512, 516, 517, 519, 286, 522, 527, 528, 529, 287, 292; 375/354, 355, 356, 357

(56) References Cited

U.S. PATENT DOCUMENTS

| 3,970,799 | | 7/1976 | Colton et al. ........................... 179/15 |
| 4,569,041 | * | 2/1986 | Takeuchi et al. ...................... 370/352 |
| 4,660,079 | * | 4/1987 | Devimeux et al. ................... 348/423 |
| 4,839,905 | * | 6/1989 | Mantovani ............................ 375/230 |
| 4,894,820 | * | 1/1990 | Miyamoto et al. ................... 370/289 |
| 4,955,054 | | 9/1990 | Boyd, Jr. et al. ..................... 379/269 |
| 5,317,690 | * | 5/1994 | Krzycki et al. ....................... 713/400 |
| 5,706,280 | * | 1/1998 | Kosugi et al. ........................ 370/244 |
| 5,742,642 | * | 4/1998 | Fertner ................................. 375/233 |

FOREIGN PATENT DOCUMENTS

| 0353890 | 2/1990 | (EP) | ................. H04J/3/12 |
| 8304359 | 12/1983 | (WO) | ............. H04M/3/56 |
| 9209152 | 5/1992 | (WO) | ................. H04J/3/12 |

OTHER PUBLICATIONS

J. Merritt, "T–carrier chip set adapts to changing network needs", Computer Design, Jun. 1, 1986, USA, vol. 25, No. 11, ISSN 0010–4566, P 79–83, XP002066185.

M. L. Cohen, "DSP–Based Architecture For Real–Time I1 Bandwidth Management and Control", Int'l Conference On Communications, Including Supercommtechnical Sessions, Atlanta, Apr. 15–19, 1990, vol. 2, Apr. 15, 1990;Institute of Electrical and Electronics Engineers, P690–697, XP000146148.

C. R. Crue, et al., "D4 Digital Channel Bank Family: The Channel Bank", Bell System Technical Journal, Nov. 1982, USA, vol. 61, No. 9, Pt. 3, ISSN 0005–8580, P2611–2661, XP000616852.

\* cited by examiner

*Primary Examiner*—Chi H. Pham
*Assistant Examiner*—Kwang B. Yao
(74) *Attorney, Agent, or Firm*—Baker Botts L.L.P.

(57) ABSTRACT

According to the teachings of the present invention, a data path interface (16) for receiving an incoming signal (14) and facilitating an interface to a digital signal processor (18) includes a synchronizer (62) for determining a signaling frame in a processed signal received from the digital signal processor (18). The data path interface (16) also includes an idle code detector (76) operable to detect an idle code in the incoming signal (14) by comparing the incoming signal (14) to at least one user-programmable idle code pattern. The data path interface (16) further including a least significant bit detector (78) operable to detect a loss of information in the incoming signal (14) by monitoring the status of the least significant bit of each channel to determine whether that bit is stuck at a particular value. The data path interface (16) still further including a daughter card interface (80) operable to receive signals containing eight-bit words and to concatenate those signals to form signals containing sixteen-bit words. The daughter card interface (80) being further operable to transmit the concatenated signal to a daughter card (28).

72 Claims, 4 Drawing Sheets

METHOD AND APPARATUS FOR FACILITATING AN INTERFACE TO A DIGITAL SIGNAL PROCESSOR

TECHNICAL FIELD OF THE INVENTION

This invention relates in general to the field of communication systems and in particular to a method and apparatus for facilitating an interface to a digital signal processor.

BACKGROUND OF THE INVENTION

In modern telecommunication systems, it is often desirable to perform various signal processing functions such as echo cancellation, noise cancellation, and voice enhancement on signals received from telecommunication lines. As such, it becomes necessary to provide an interface between a telecommunication line and a digital signal processor capable of performing such functions.

One function of such an interface is to ensure proper signal synchronization. Incoming signals contain timing and synchronization information which can be distorted or lost during various signal processing functions. To ensure proper system operation, this signaling information must be accurately replaced prior to transmitting the processed signal. One approach to replacing lost signaling information is to insert signaling information into a particular bit of each frame in the signal. A problem with this method arises in T1 applications, where signaling information resides only in particular frames of the signal. Inserting signaling information into every frame of a T1 signal results in signal degradation as valid data is overwritten with signaling information. Another approach to replacing lost signaling information is to utilize a digital signal processor containing a synchronization algorithm to define the proper signaling frames. This approach is problematic, however, because adding such an algorithm to the digital signal processor itself would require implementing a myriad of complex logic resulting in increased expense.

In the interest of economy, telecommunication systems are often designed such that several system elements share a single digital signal processor. Where several system elements compete for a single digital signal processor, necessity dictates that the limited processing resources not be wasted by processing incomplete data or idle code. It therefore becomes desirable to detect the presence of incomplete data or idle code in the incoming signal, and to disable the digital signal processor with respect to those signals. In this way, the system's limited processing resources are conserved, leaving more resources available for the processing of incoming signals containing valid data.

One approach to detecting idle code is to compare the incoming signal to a fixed idle code pattern, such as "11111111." A disadvantage of this method is that fixed idle code patterns offer less system stability than a varied idle code pattern, such as "10101010." Further, a received signal may contain incomplete information, in other words less information than that originally transmitted. This may occur where the least significant bit of the received signal becomes "stuck" at "0" or "1." One approach to detecting this condition is to perform frequency analysis on the incoming signal. A disadvantage of this method is that it is complex and expensive to implement.

SUMMARY OF THE INVENTION

Accordingly, a need has arisen for a telecommunication line-to-digital signal processor interface that provides synchronization of a transmitted processed signal, detects idle code and incomplete data, and facilitates interfaces between a variety of digital signal processor's and communication lines. In accordance with the present invention, an apparatus and method for facilitating an interface to a digital signal processor are provided that substantially eliminate or reduce disadvantages and problems associated with conventional digital signal processor interfaces.

According to one aspect of the present invention, a data path interface for receiving an incoming signal and facilitating an interface to a digital signal processor includes a synchronizer operable to receive a multiframe synchronization signal and to generate a transmitted multiframe synchronization signal in response thereto. The transmitted multiframe synchronization signal determining a signaling frame in a processed signal received from the digital signal processor to reduce signaling noise.

According to another aspect of the present invention, a data path interface for receiving an incoming signal and facilitating an interface to a digital signal processor includes an idle code detector operable to receive an incoming signal and to detect an idle code present in the incoming signal by comparing the incoming signal to at least one user-programmable idle code pattern.

According to yet another aspect of the present invention, a data path interface for receiving an incoming signal and facilitating an interface to a digital signal processor includes a least significant bit detector operable to detect a loss of information in the incoming signal by monitoring the status of the least significant bit of each channel to determine whether it is stuck at a particular value.

According to still another aspect of the present invention, a data path interface for receiving an incoming signal and facilitating an interface to a digital signal processor includes a daughter card interface operable to facilitate an interface to a daughter card. The daughter card interface may include a multiplexer operable to receive and concatenate signals containing N-bit words to form concatenated signals containing 2N-bit words. The daughter card interface being further operable to transmit the concatenated signals to a daughter card.

The present invention provides various technical advantages over conventional digital signal processor interfaces. For example, one technical advantage includes facilitating synchronization of the processed signal by generating a transmitted multiframe synchronization signal. Utilizing the transmitted multiframe synchronization signal reduces signaling noise by defining correct signaling frames in the processed signal. Another technical advantage of the present invention is providing a method of idle code detection based on user-programmable idle code patterns. Implementing user-programmable idle code patterns facilitates the use of varied idle code patterns which offer increased system stability over systems using fixed idle code patterns. Yet another advantage of the present invention is the provision of a simple method of detecting a loss of information in the incoming signal.

Still another advantage of the present invention is facilitating an interface with a daughter card wherein the interface concatenates incoming signals having N-bit words and transmits concatenated signals containing 2N-bit words to the daughter card.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
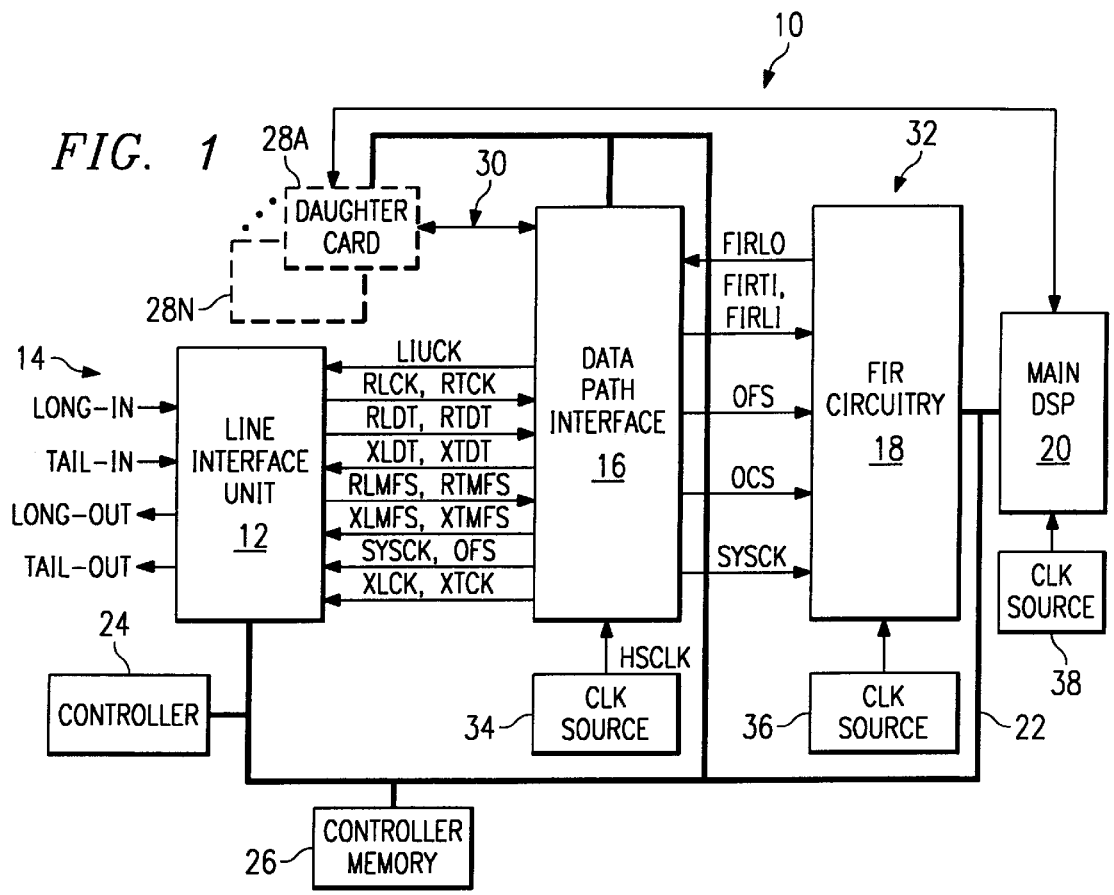
FIG. 1 is a simplified block diagram of a communication system according to one embodiment of the present invention.

The preferred embodiments of the present invention are illustrated in FIGS. 1–8, like reference numerals being used to refer to like and corresponding parts of the various drawings.

Referring to FIG. 1, a simplified block diagram of a communication system 10 is shown to illustrate a possible operating environment of the present invention. Communication system 10 includes a line interface unit 12 which may receive an incoming signal 14. Incoming signal 14 may include a long-input signal (LONG-IN) and a tail-input signal (TAIL-IN). Input signal LONG-IN may include a majority of the information transmitted in a telephone conversation. Input signal TAIL-IN represents the amount of signal returned to the transmitting party as an echo, measured in milliseconds. A tail of zero milliseconds corresponds to a situation where there is no echo.

Line interface unit 12 may be coupled to a data path interface 16, which may in turn be coupled to a finite impulse response circuitry 18. Finite impulse response circuitry 18 may include an application-specific integrated circuit group of filters operable to perform particular signal processing functions, such as echo cancellation. A main digital signal processor 20 is coupled to finite impulse response circuitry 18 through a control bus 22.

Control bus 22 couples a controller 24 to line interface unit 12, data path interface 16, finite impulse response circuitry 18 and main digital signal processor 20. A controller memory 26 may also be coupled to controller 24 by control bus 22. One or more daughter cards 28A–N, referred to generally as daughter card 28, may be coupled to data path interface 16 by a data path interface serial bus 30. Daughter card 28 may be further coupled to main digital signal processor 20 by a daughter card-digital signal processor serial bus 32, and to controller 24 by control bus 22. External clock sources 34, 36 and 38 may be coupled to data path interface 16, finite impulse response circuitry 18 and main digital signal processor 20, respectively.

In operation, line interface unit 12 may receive incoming signal 14 from a communication channel 15 such as a T1, E1, concentration highway interface (CHI), E3 or DS3 line. Line interface unit 12 operates to frame incoming signal 14. Line interface unit 12 extracts the data from incoming signal 14 and transmits the data to data path interface 16 in a long-in-data signal (RLDT) and a tail-in-data signal (RTDT). Further, line interface unit 12 extracts synchronization information from incoming signal 14 and transmits the synchronization information to data path interface 16 in a received long-multiframe-synchronization signal (RLMFS) and a received tail-multiframe-synchronization signal (RTMFS). In addition, line interface unit 12 may reconstruct timing signals from incoming signal 14 to generate a long-clock signal (RLCK) and a tail-clock signal (RTCK). Line interface unit 12 may transmit these timing signals to data path interface 16.

Data path interface 16 utilizes timing signals RLCK and RTCK, and received multiframe synchronization signals RLMFS and RTMFS, to produce timing and synchronization signals for use within data path interface 16, as well as for use in line interface unit 12 and finite impulse response circuitry 18. Data path interface 16, for example, generates a transmitted-long-clock signal (XLCK) and a transmitted-tail-clock signal (XTCK), which serve as timing signals for a long-output signal (LONG-OUT) and a tail-output signal (TAIL-OUT), respectively. In addition, data path interface 16 may generate an external timing signal (LIUCK) which may be used in line interface unit 12. Data path interface 16 further produces transmitted long and tail multiframe-synchronization signals (XLMFS, XTMFS) which facilitate signal synchronization in line interface unit 12, thus reducing signaling noise of the signal transmitted from line interface unit 12.

In addition to generating timing and synchronization signals for its internal use, data path interface 16 generates timing and synchronization signals for use throughout communication system 10. For example, data path interface 16 generates a system clock signal (SYSCK) and an output-frame-synch signal (OFS), which are propagated to line interface unit 12 and finite impulse response circuitry 18. Additionally, data path interface 16 generates an output-channel-synch signal (OCS), which is transmitted to finite impulse response circuitry 18.

Upon receiving data signals RLDT and RTDT, data path interface 16 may monitor these signals for the presence of idle code and/or a stuck least significant bit. Upon detection of an idle code pattern or a stuck least significant bit, data path interface 16 may disable finite impulse response circuitry 18 and/or daughter card 28 to conserve system resources. Details of idle code and least significant bit detection are set forth below.

Data path interface 16 may pass data signals RLDT and RTDT to daughter card 28 for preliminary signal processing.

Daughter card 28 may perform a variety of signal processing functions, such as noise cancellation. Upon completion of this signal processing, daughter card 28 transmits data signals RLDT and RTDT back to data path interface 16 over data path interface serial bus 30.

Besides transmitting the incoming signal to a daughter card for preliminary signal processing, data path interface 16 may also transmit input signals finite impulse response-tailin (FIRTI) and finite impulse response-long-in (FIRLI) to finite impulse response circuitry 18 for primary signal processing. Finite impulse response circuitry may perform any number of signal processing functions, such as echo cancellation. Input signals FIRTI and FIRLI may, in some cases, comprise input signals RLDT and RTDT, which will have passed directly through data path interface 16 from line interface unit 12. In other cases, input signals FIRTI and FIRLI may comprise input signals RLDT and RTDT after having been preliminarily processed by daughter card 28. In any case, finite impulse response circuitry 18 receives input signals FIRTI and FIRLI and performs primary signal processing, such as echo cancellation. Finite impulse response circuitry 18 then returns a processed signal, finite impulse response-long-out (FIRLO) to data path interface 16. Data path interface 16 may transmit processed signal FIRLO to a second daughter card 28B for additional signal processing, such as voice enhancement. Daughter card 28B then returns the further processed signal FIRLO to data path interface 16 over data path interface serial bus 30.

Data path interface 16 may transmit processed signals transmitted-long-data (XLDT) and transmitted-tail-data (XTDT) to line interface unit 12. Processed signals XLDT and XTDT may comprise the processed signal FIRLO passing directly from finite impulse response circuitry 18, or the processed signal FIRLO after having been further processed by one or more of daughter cards 28A–N. Line interface unit 12 receives processed signals XLDT and XTDT and synchronizes them for transmission across communication line 15.

Figure 2:
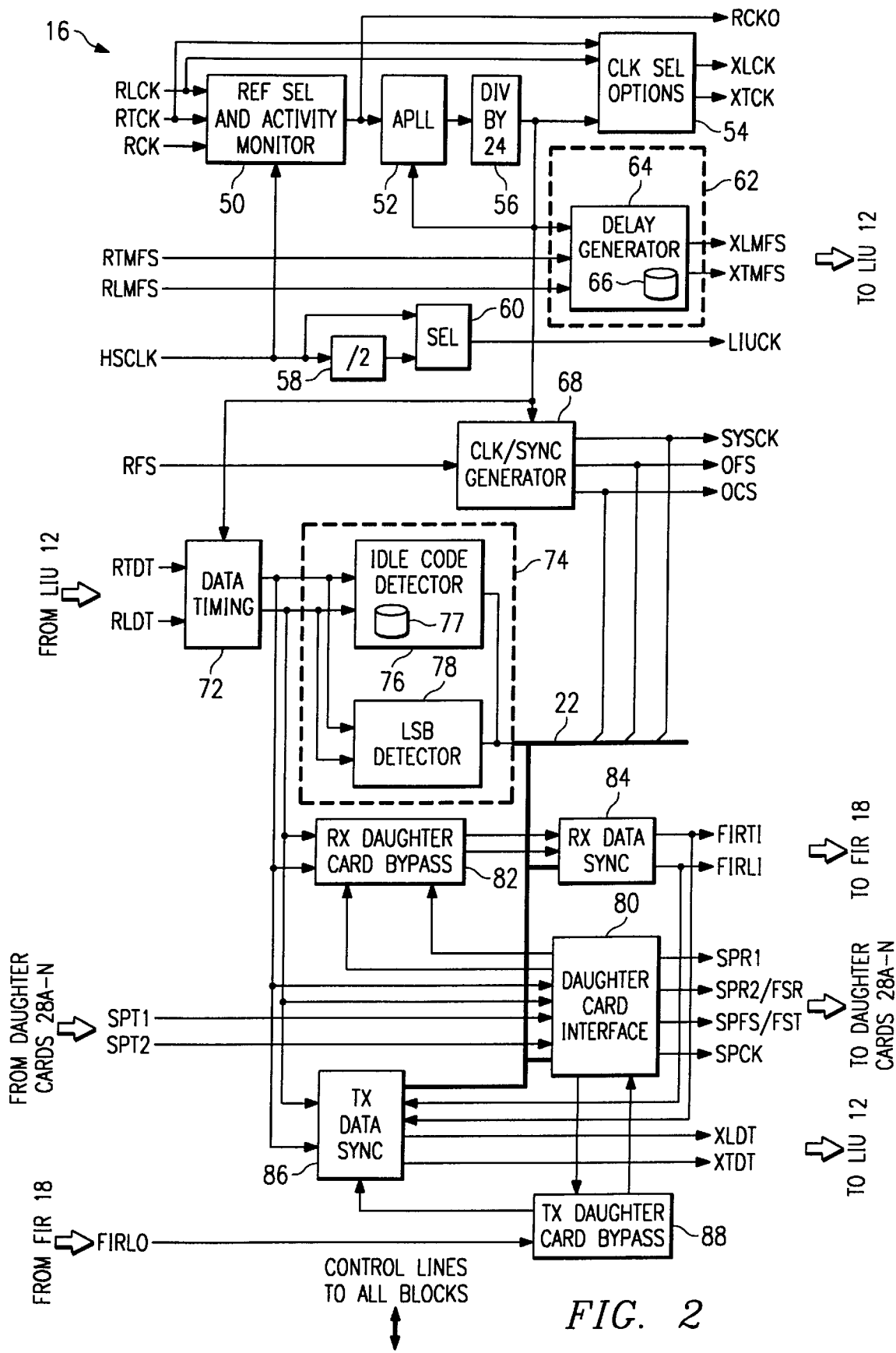
FIG. 2 is a simplified block diagram of a data path interface device according to the present invention.

FIG. 2 is a simplified block diagram of data path interface 16 according to the teachings of the present invention. Data path interface 16 may include a reference clock selecter and activity monitor 50 which receives timing signals RLCK and RTCK from line interface unit 12, as well as an external timing signal RCK. External timing signal RCK may be generated, for example, by a crystal-controlled oscillator internal to data path interface 16. Reference clock selector 50 may transmit external timing signal RCK to external components as external output timing signal RCKO. Reference clock selecter 50 may further receive a high speed clock signal (HSCLK) from external clock source 34 (FIG. 1). The output signal from reference clock selecter 50 may be transmitted to an analog phase locked loop 52. A divider circuitry 56 receives an output from analog phase locked loop 52 and divides that signal by a factor of N. The factor N may be any appropriate division factor, such as, for example, 24. A clock options selecter 54 receives timing signals RLCK and RTCK from line interface unit 12 (FIG. 1), as well as an output signal from divider circuitry 56. Clock option selecter 54 selects either timing signals RLCK and RTCK, or smoothened versions of signals RLCK and RTCK output from divider circuitry 56, to generate transmitted timing signals XLCK and XTCK. Transmitted timing signals XLCK and XTCK are then transmitted to line interface unit 12.

Data path interface unit 16 may further include a dividing circuitry 58, which is coupled to a selecting circuitry 60. Dividing circuitry 58 and selecting circuitry 60 receive high speed clock signal HSCLK. Selecting circuitry 60 selects either clock signal HSCLK, or a divided version thereof and transmits that signal as a timing signal LIUCK. Timing signal LIUCK is transmitted to line interface unit 12, and may serve as an external clock reference therefor.

Data path interface 16 may also include a synchronizer 62 which receives multiframe synchronization signals RTMFS and RLMFS from line interface unit 12, as well as the output of divider circuitry 56. Synchronizer 62 may include a delay generator 64 and a delay memory 66. Synchronizer 62 generates transmitted multiframe synchronization signals XLMFS and XTMFS, which are transmitted to line interface unit 12. Details of the operations of synchronizer 62 are set forth below.

Data path interface 16 may include a clock/sync generator 68, which receives the output from divider circuitry 56 and an external reference-system-frame synchronization signal (RFS) from external clock source 34. Clock/sync generator 68 generates a system clock signal (SYSCK), a frame synchronization signal (OFS) and a channel synchronization signal (OCS). These signals may be routed to control bus 22 for use within data path interface 16. Additionally, these signals may be transmitted to line interface unit 12 and finite impulse response circuitry 18 (FIG. 1) to provide timing and synchronization signals therein.

Data path interface 16 may further include a data timing unit 72, which receives data signals RTDT and RLDT from line interface unit 12, as well as the output signal from divider circuitry 56. Data timing unit 72 utilizes the timing signal received from divider circuitry 56 to synchronize data signals RTDT and RLDT for operation within data path interface 16. A data monitoring unit 74 may receive data signals RTDT and RLDT from data timing unit 72. Data monitoring unit 74 may include an idle code detector 76 and a least significant bit (LSB) detector 78, which may each receive data signals RTDT and RLDT from data timing unit 72. Idle code detector 76 may further include an idle code memory 77 operable to store a user programmable idle code pattern. Idle code detector 76 and least significant bit detector 78 may be further coupled to control bus 22.

A daughter card interface 80 may receive data signals RTDT and RLDT from data timing unit 72. Daughter card interface 80 may pass data signals RTDT and RLDT to daughter card 28 (FIG. 1). Daughter card interface 80 may transmit data signals RTDT and RLDT to daughter card 28 over one or more serial ports (SPR1 and SPR2 shown). Additionally, daughter card interface 80 may transmit synchronization signals frame-sync (FSR), serial port framesynch (SPFS) and transmit-frame-sync (FST) to daughter card 28. Similarly, daughter card 80 may transmit a serial port timing signal (SPCK) to daughter card 28.

Daughter card 28 may receive data signals RTDT and RLDT, process the signals and return processed signals to daughter card interface 80. Daughter card interface 80 receives the processed signals through one ore more transmit-serial ports (SPT1 and SPT2 shown). Daughter card interface 80 may pass the processed signals to a receive-daughter card bypass 82. In that case, receive-daughter card bypass 82 receives the processed signals and transmits them to a receive-data synchronizer 84, which transmits the processed signals to finite impulse response circuitry 18 as FIRT1 and MRL1 signals.

In some cases, it may be desirable to bypass daughter card 28, so as to avoid preliminary signal processing.

Receive-daughter card bypass 82 may facilitate such a bypass by receiving data signals RTDT and RLDT from data timing unit 72 and routing them directly to receive-data synchronizer 84. In this way, finite impulse response circuitry 18 may receive data signals RTDT and RLDT directly from line interface unit 12.

As described above, data signals RTDT and RLDT may reach receive-data synchronizer 84 by passing directly from data timing unit 72, or after having been preliminarily processed by daughter card 28. In either case, receive-data synchronizer 84 may either route the signal received to finite impulse response circuitry 18, or alternatively, to a transmit-data synchronizer 86. Signals routed to transmit-data synchronizer 86 are transmitted directly to line interface unit 12 as processed signals XLDT and XTDT.

Signals transmitted to finite impulse response circuitry 18 are received and processed by finite impulse response circuitry 18. Finite impulse response circuitry 18 generates processed signal FIRLO and transmits this signal to a transmit-daughter card bypass 88. Transmit-daughter card bypass may either transmit the processed signal FIRLO to transmit-data synchronizer 86, or to daughter card interface 80. If no additional signal processing is desired, transmit-daughter card bypass 88 routes processed signal FIRLO to transmit-data synchronizer 86, bypassing daughter card 28. If, however, additional signal processing, such as voice enhancement, is desired, transmit-daughter card bypass 88 may route processed signal FIRLO to daughter card interface 80. Daughter card interface 80 may then transmit processed signal FIRLO to daughter card 28 for additional signal processing.

Daughter card 28 receives processed signal FIRLO, performs some type of signal processing, and returns a further processed signal FIRLO to serial ports SPT1 and/or SPT2 of daughter card interface 80. Daughter card interface 80 may transmit further processed signal FIRLO to transmit-daughter card bypass 88. Transmit-daughter card bypass 88 may either transmit further processed signal FIRLO back to daughter card interface 80 for still further signal processing by daughter card 28, or transmit the signal to transmit-data synchronizer 86.

Transmit-data synchronizer 86 may receive data signals RTDT and RLDT directly from line interface unit 12, or may receive those signals after some level of signal processing, either from transmit-daughter card bypass 88 or from receive-data synchronizer 84. In any case, transmit-data synchronizer 86 transmits the received signal to line interface 12 as transmitted-processed signals XLDT and XTDT.

In operation, reference clock selecter 50 receives timing signals RLCK and RTCK, as well as external clock references RCK and HSCLK. Reference clock selecter 50 monitors the incoming signals for a loss of clock. Assuming no loss of clock occurs, reference clock selecter 50 may generate a transmitted external reference clock signal RCKO. Reference clock selecter 50 may also select and transmit one of the timing signals received from the line interface unit 12, RLCK or RTCK, and transmit that signal to analog phase locked loop 52. Analog phase locked loop 52 and dividing circuitry 56 operate to eliminate jitter in the resultant timing signals, which are passed to clock option selecter 54, synchronizer 62, clock/sync generator 68 and data timing unit 72. Analog phase locked loop 52 may operate to automatically power down when it's operation becomes unnecessary.

Synchronizer 62 receives a timing signal, RLCK or RTCK, from analog phase locked loop 52, as well as received multiframe synchronization signals RTMFS and RLMFS from line interface unit 12. Timing signals RLCK and RTCK and received multiframe synchronization signals RTMFS and RLMFS comprise the signaling information of incoming signal 14.

This signaling information resides in particular frames of incoming signal 14. In a T1 application, for example, this signaling information may be contained, for example, in the eighth bit of every sixth frame. Because daughter card 28 and finite impulse response circuitry 18 typically do not distinguish between bits containing data and bits containing signaling information, signaling information can be distorted or lost during signal processing. To facilitate transmission of the processed signals over communication line 15, line interface unit 12 must replace the lost signaling information. One method of replacing the lost signaling information is to insert signaling information into the eighth bit of each frame. In T1 applications, however, this would result in signal degradation, as line interface unit 12 would overwrite data bits as well as signaling bits with signaling information.

This signal loss can be avoided by determining which of the frames originally contained signaling bits, and inserting signaling information only in those frames. In T1 applications, for example, this may decrease signaling noise by 2 decibels.

Received multiframe synchronization signals RLMFS and RTMFS contain information defining the original location of the signaling bits in incoming signal 14. Synchronizer 62 may generate transmitted multiframe synchronization signals XLMFS and XTMFS by introducing a delay in the received multiframe synchronization signals that is commensurate with the delay path of data signals RLDT and RTDT as they pass through daughter card 28 and/or finite impulse response circuitry 18. This delay value may be a user programmable delay value selected at the user's discretion.

In that case, synchronizer 62 may include a delay memory 66 for storing the user programmable delay value. Upon completion of processing data signals RLDT and RTDT, data path interface 16 may simultaneously transmit transmitted multiframe synchronization signals XLMFS and XTMFS and processed signals XLDT and XTDT to line interface 12. Transmitted multiframe synchronization signals XLFMS and XTMFS define for line interface unit 12 the proper signaling frames in processed signals XLDT and XTDT. In this way, line interface unit 12 may operate to insert signaling information only in bits originally designated as signaling bits, avoiding signal degradation.

Data monitoring unit 74 may receive data signals RTDT and RLDT from data timing unit 72. Data monitoring unit 74 may operate to verify the contents of data signals RTDT and RLDT. For example, idle code detector 76 may receive data signals RTDT and RLDT, and monitor the signals for the presence of idle code. Upon detection of idle code, idle code detector 76 may record the detection in an idle detection register. Similarly, least significant bit detector 78 may monitor data signals RTDT and RLDT for a loss of information in the incoming signal. This may be accomplished, for example, by monitoring for the presence of a stuck least significant bit. Upon detecting a stuck bit, least significant bit detector 78 may record the occurrence in a least significant bit register. Controller 24 (FIG. 1) periodically monitors these memory registers. Upon finding a record of an occurrence of an idle code pattern or a stuck bit, controller 24 may disable one or more system elements to preserve system resources. Controller 24 may disable or enable system elements by transmitting an appropriate signal over control bus 22.

Figure 3:
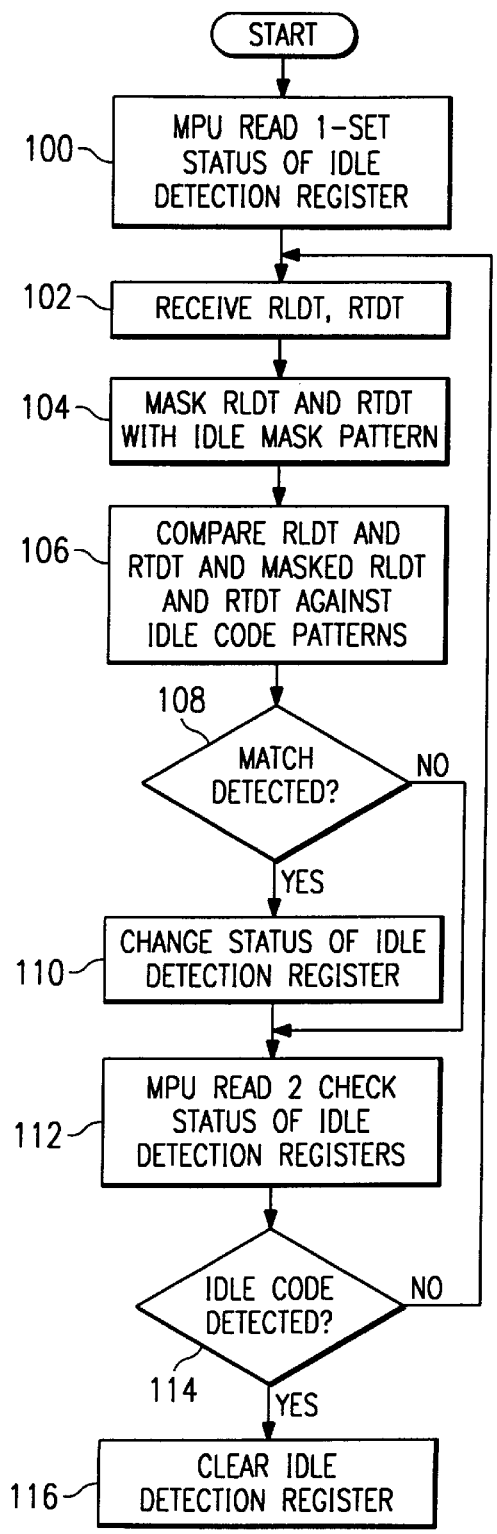
FIG. 3 illustrates an exemplary method of monitoring the content of an incoming signal for idle code.

FIG. 3 is a simplified block diagram which illustrates and exemplary method of detecting idle code according to the teachings of the present invention. The method begins at step 100, where controller 24 performs a first READ of an idle detection register. During the first READ, controller 24 sets the status of the idle detection register. At step 102, data path interface 16 may receive data signals RLDT and RTDT from line interface unit 12. At step 104, signals RLDT and RTDT are masked with an idle mask pattern. This idle mask pattern may be any bit pattern operable to mask the incoming data. By using a mask pattern, the number of idle patterns which may be detected is effectively doubled. At step 106, idle code detector 76 compares the masked and unmasked data signals against a reference idle code pattern. The reference idle code pattern is programmable to the user's specification. Thus, rather than using a fixed idle code pattern, such as "11111111," the user may program a variable pattern, such as "01010101." Utilizing a variable idle code pattern is advantageous as it provides increased system stability compared to systems implementing fixed idle code patterns.

If a match between the masked or unmasked data and the reference idle code pattern is determined, the status of the idle detection register is changed at step 110 to reflect detection of idle code. At step 112, controller 24 performs a second READ to determine the status of the idle detection register. If idle code is detected at step 114, controller 24 clears the status of the idle detection register. Controller 24 may then, through control bus 22, disable finite impulse response circuitry 18 with respect to the incoming idle code signal to preserve system resources.

It should be noted that the above-described method is only one example of a method of detecting idle code, and that others could be used effectively. For example, an alternative to masking the incoming data would be to mask the reference idle code pattern to provide a second reference idle code pattern. The incoming data would then be compared against the masked or unmasked reference idle code pattern for a match.

Figure 4:
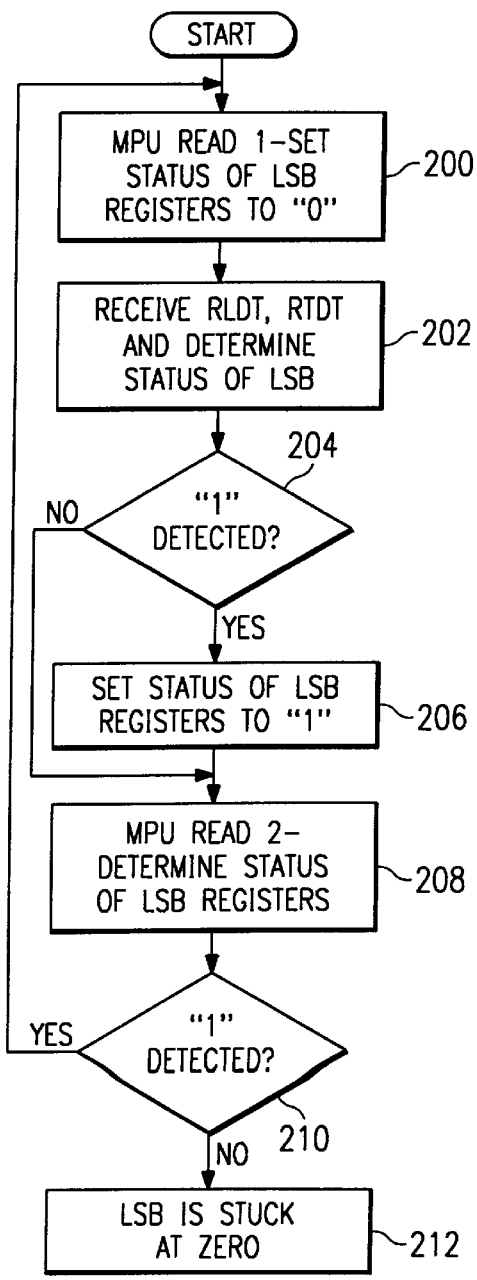
FIG. 4 illustrates an exemplary method of monitoring the content of an incoming signal for a loss of information in the incoming signal.

FIG. 4 is a simplified block diagram illustrating an exemplary method of detecting a loss of information in incoming signal 14. Least significant bit detector 78 may, for example, detect the presence of an eighth bit which is stuck at "0" or stuck at "1". The illustrative example depicted in FIG. 4 illustrates a method of detecting a least significant bit that is stuck at zero.

The method begins at step 200, where controller 24 performs a first READ in which it sets the status of a least significant bit (LSB) register to "0." At step 202, least significant bit detector 78 receives data signals RLDT and RTDT, and determines the status of the least significant bit (LSB) of each signal. If a "1" is detected at step 204, the status of the least significant bit register is changed to "1" at step 206. Detecting a "1" at step 206 indicates that incoming signal 14 is not stuck at zero. At step 208, controller 24 performs a second READ in which it determines the current status of the least significant bit register. The timing of the first and second READs is controlled by the user. Therefore, the user determines the acceptable interval after which a bit will be deemed "stuck" at a particular value. At step 210, if a "1" has been detected between the two controller READs, no least significant bit detection is declared and controller 24 resets the status of the least significant bit register to "0." If, however, no "1" is detected between the two READS of controller 24, the least significant bit of incoming signal 14 is deemed to be stuck at zero. Upon detecting a stuck least significant bit at step 212, controller 24 may disable system elements to preserve system efficiency.

Referring again to FIG. 2, daughter card interface 80 may receive data signals RTDT and RLDT from data timing unit 72. Daughter card interface 80 provides an interface for any external daughter card capable of interfacing with a multiple channel pulse code modulation (PCM) signal. Daughter card interface 80 may include two serial ports for interfacing with daughter card 28. Daughter card interface 80 may transmit data signals RTDT and RLDT, or data signal FIRLO to daughter card 28 through receive-serial ports SPR1 and SPR2. Daughter card 28 may perform some type of signal processing function, such as noise cancellation or voice enhancement, to generate a processed signal. Daughter card interface 80 may then receive the processed signal from daughter card 28 through transmit-serial ports SPT1 and SPT2.

Figure 5:
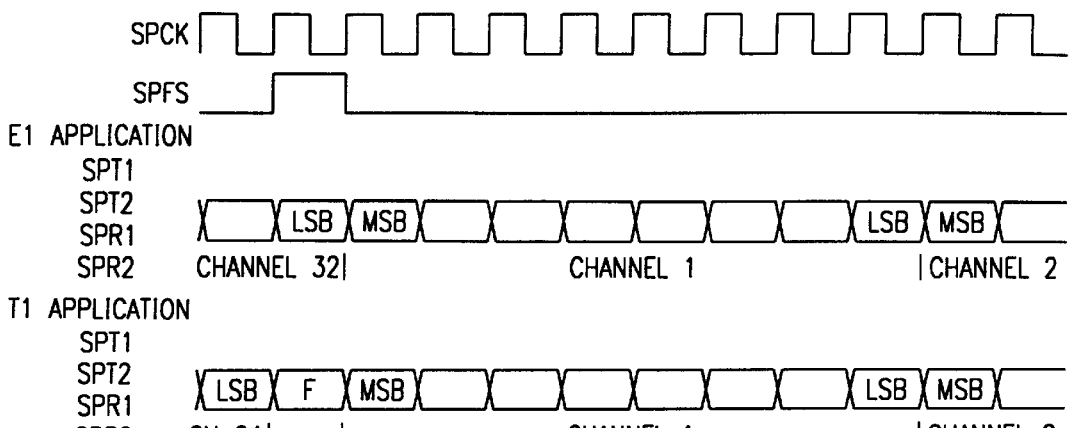
FIG. 5 is an exemplary timing diagram showing a possible timing sequence of an interface between a data path interface and a digital signal processor for both T1 and E1 applications, the data path interface operating in a non-multiplex mode.

FIG. 5 shows a timing diagram for a non-multiplex interface between data path interface 16 and daughter card 28. Frame sync signal SPFS operates to synchronize the data signals to timing signal SPCK. In a non-multiplex mode, each of the two independent serial ports may support a maximum of, for example, twenty-four channels in a T1 application and thirty-two channels in an E1 application, each channel having a word length of eight bits.

Figure 6:
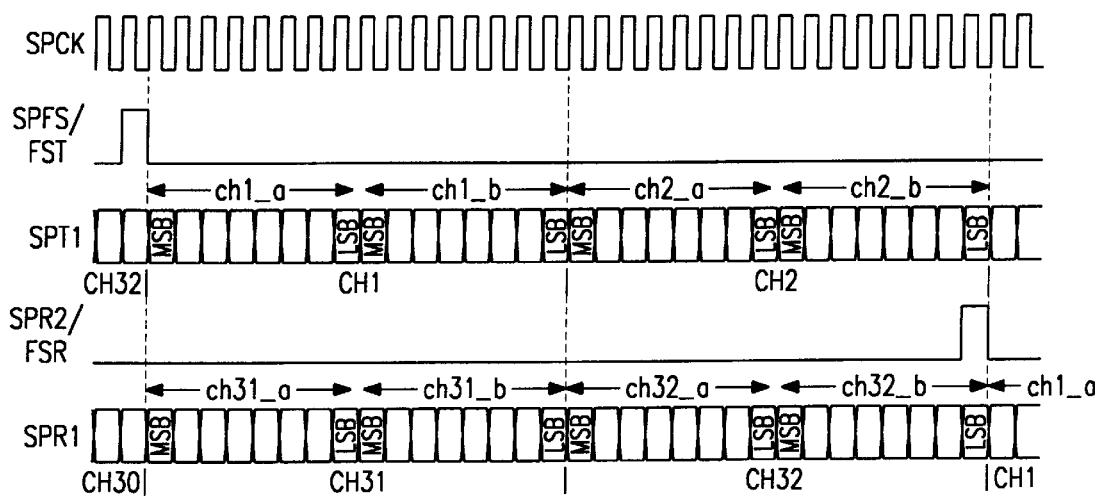
FIG. 6 is an exemplary timing diagram showing a possible timing sequence of an interface between a data path interface and a digital signal processor for an E1 application, the data path interface operating in a multiplex mode.
Figure 7:
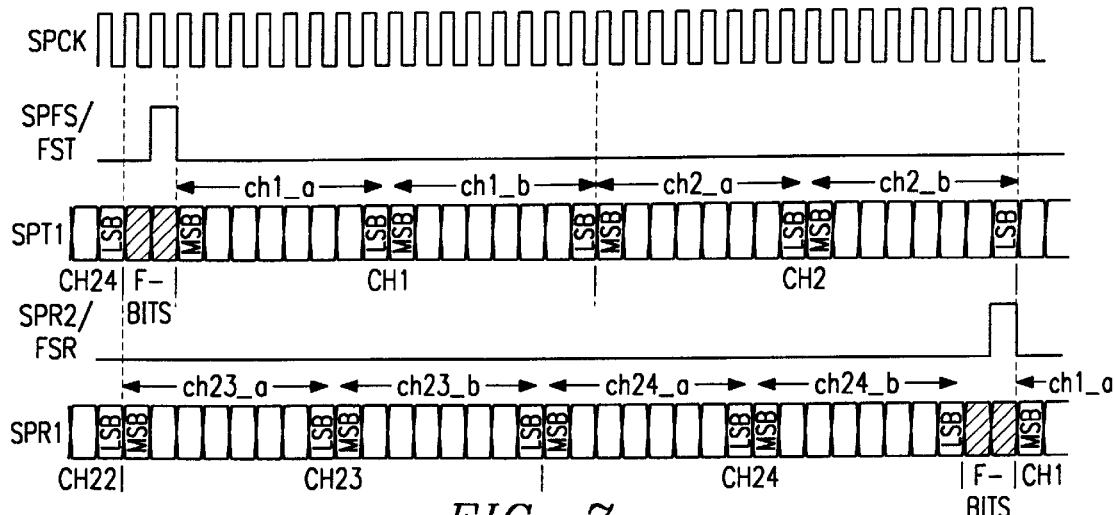
FIG. 7 is an exemplary timing diagram showing a possible timing sequence of an interface between a data path interface and a digital signal processor for a T1 application, the data path interface operating in a multiplex mode.

FIG. 6 illustrates the timing sequence of a multiplex mode E1 application. FIG. 7 illustrates a timing sequence of a multiplex mode T1 application. In multiplex mode, daughter card interface 80 may operate to concatenate signals containing eight bit words to form signals containing sixteen bit words. By concatenating the incoming signal in this way, daughter card interface 80 operates to increase the speed of data transfer to daughter card 28 by a factor of two. As shown in FIGS. 6–7, the word length in multiplex mode is sixteen bits. Each channel of data may contain two eight-bit portions, channel A and channel B. Channel A may contain the data signal RTDT. Channel B may contain either the data signal RLDT or the processed signal FIRLO, as selected by controller 24. The concatenated signals are transmitted to daughter card 28 over receive-serial port SPR1. These signals are synchronized to the receive-frame-sync signal, FSR. Daughter card 80 receives processed signals from daughter card 28 over serial ports SPT1 and SPT2. These processed signals are synchronized through the transmit-frame-sync signal FST.

Figure 8:
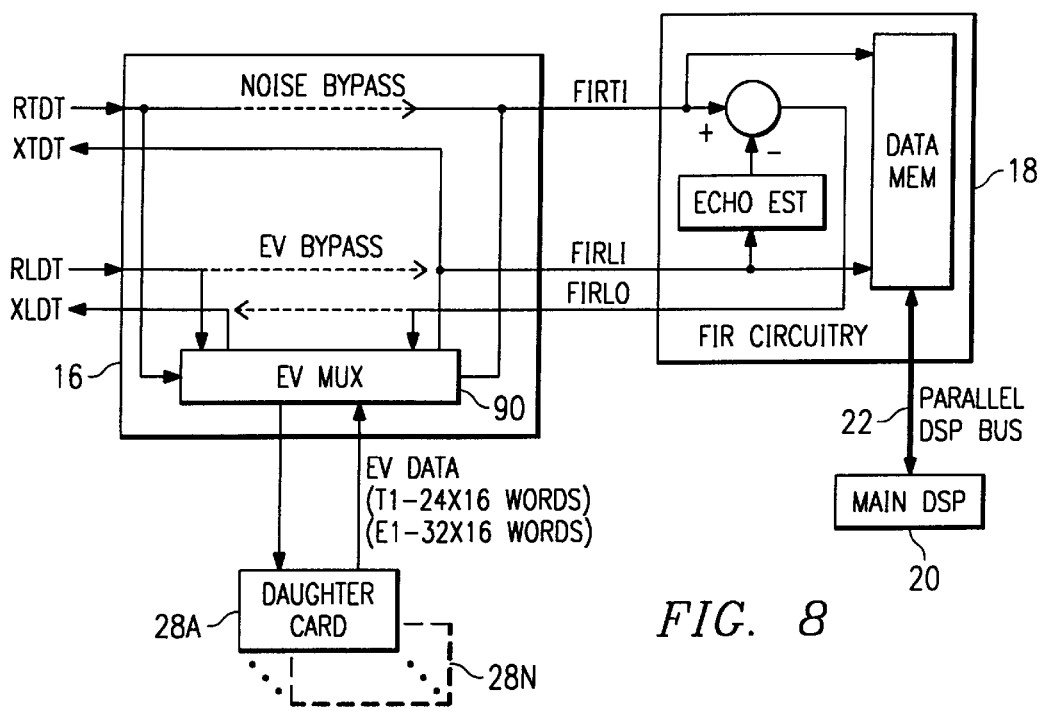
FIG. 8 is a simplified block diagram of a communication system according to the present invention showing the data flow through a data path interface to external components.

FIG. 8 illustrates the data flow between data path interface 16, daughter card 28 and finite impulse response circuitry 18. Daughter card interface 80 may include a multiplexer 90 which may operate to perform the aforementioned concatenation. As described above, it may be desirable to perform preliminary signal processing, such as noise cancellation, on data signal RTDT prior to performing primary data processing at finite impulse response circuitry 18. In that case, data path interface 16 may receive data signal RTDT and transmit it to daughter card 28 for preliminary signal processing. Daughter card 28 receives data signal RTDT, processes the signal, and returns a preliminarily processed signal RTDT to data path interface 16. Daughter card interface 16 may transmit preliminarily processed signal RTDT to finite impulse response circuitry 18 as data signal FIRTI.

Additionally, it may be desired to perform preliminary signal processing, such as voice enhancement, on data signal RLDT prior to performing primary data processing at finite impulse response circuitry 18. In that case, data path interface 16 may receive data signal RLDT and transmit it to daughter card 28 for preliminary signal processing. Daughter card 28 receives data signal RLDT, processes the signal, and returns a preliminarily processed signal RLDT to data path interface 16. Daughter card interface 16 may transmit preliminarily processed signal RLDT to finite impulse response circuitry 18 as data signal FIRLI.

If no preliminary signal processing is desired, data path interface 16 may bypass daughter card 28 by utilizing receive-daughter card bypass 82 and transmit-daughter card bypass 88. For example, data path interface 16 may transmit data signal RTDT directly to finite impulse response circuitry 18 as data signal FIRTI, using receive-daughter card bypass 82 to bypass noise cancellation daughter card 28. Similarly, data path interface 16 may utilize transmit-daughter card bypass 88 to bypass enhanced voice daughter card 28 by transmitting RLDT directly to finite impulse response circuitry 18 as data signal FIRLI.

It may further be desired to perform additional signal processing, such as voice enhancement after performing primary signal processing at finite impulse response circuitry 18. In that case, data path interface 16 may receive processed data signal FIRLO from finite impulse response circuitry 18 and transmit it to daughter card 28 for additional signal processing. Data path interface 16 receives the additionally processed signal FIRLO from daughter card 28 and transmits it to line interface unit 12 as processed signal XLDT. If additional signal processing at daughter card 28 is not desired, data path interface 16 may receive processed signal FIRLO and utilize transmit-daughter card bypass 88 to bypass enhanced voice daughter card 28. In this way, data path interface 16 may transmit the processed signal directly to line interface unit 12 as processed signal XLDT.

Thus, it is apparent that there has been provided, in accordance with the present invention, an apparatus and method for facilitating an interface to a digital signal processor. Although the present invention has been described in detail, it should be understood that various changes, substitutions, and alterations readily ascertainable by those skilled in the art can be made herein without departing from the spirit and scope of the present invention as defined by the following claims.

What is claimed is:

1. A data path interface device for receiving an incoming signal and facilitating an interface to a digital signal processor operable to process the incoming signal, the data path interface device comprising:
a synchronizer operable to receive a multiframe synchronization signal, the multiframe synchronization signal being a predetermined portion of the incoming signal, the synchronizer operable to generate a transmitted multiframe synchronization signal in response thereto, the transmitted multiframe synchronization signal operable to identify a signalling frame for insertion of signalling information in a processed signal generated by the digital signal processor from the incoming signal to reduce signalling noise.

2. The data path interface device of claim 1, wherein the digital signal processor comprises an echo canceler operable to receive and perform echo cancellation on the incoming signal.

3. The data path interface device of claim 1, wherein the synchronizer comprises a delay generator, the delay generator operable to generate the transmitted multiframe synchronization signal by introducing a delay in the received multiframe synchronization signal in response to a delay in the data path of the incoming signal through the digital signal processor.

4. The data path interface device of claim 3, wherein the delay generator comprises a delay memory operable to store a user-programmable delay value, the delay generator operable to generate the transmitted multiframe synchronization signal in response to the user-programmable delay value.

5. The data path interface device of claim 1, wherein the synchronizer generates the transmitted multiframe synchronization signal by introducing a delay into the received multiframe synchronization signal, the delay coinciding with a delay in the data path of the incoming signal through the digital signal processor, and wherein the data path interface device is coupled to a line interface unit, the line interface unit operable to receive the transmitted multiframe synchronization signal and the processed signal, the line interface unit further operable to insert signaling information only into the signaling frame of the processed signal in response to the transmitted multiframe synchronization signal.

6. The data path interface device of claim 1, further comprising an idle code detector operable to receive the incoming signal and to detect an idle code present in the incoming signal.

7. The data path interface device of claim 6, wherein the idle code detector comprises an idle code memory operable to store at least one user-programmable idle code pattern, the idle code detector operable to detect an idle code present in the incoming signal in response to the user-programmable idle code pattern.

8. The data path interface device of claim 1, further comprising a least significant bit detector operable to receive the incoming signal and to detect a loss of information in the incoming signal.

9. The data path interface device of claim 1, further comprising a data monitoring unit operable to receive the incoming signal and to detect an idle code present in the incoming signal, the data monitoring unit further operable to detect a loss of information in the incoming signal.

10. The data path interface device of claim 9, further comprising a daughter card interface operable to interface with at least one daughter card.

11. The data path interface device of claim 1, further comprising a daughter card interface operable to interface with at least one daughter card.

12. The data path interface device of claim 11, wherein the daughter card interface comprises a multiplexer operable to receive and concatenate signals containing N-bit words to form concatenated signals containing 2N-bit words, the daughter card interface further operable to transmit the concatenated signals to the daughter card.

13. The data path interface device of claim 1, further comprising an analog phase locked loop operable to generate timing and synchronization signals for use within the data path interface device and for interfacing to external devices.

14. A communication system for providing enhanced voice services comprising:
a line interface unit operable to receive an incoming signal, the line interface unit operable to extract synchronization information from the incoming signal, the line interface unit operable to generate a multiframe synchronization signal carrying the synchronization information;
a digital signal processor operable to receive the incoming signal and generate a processed signal therefrom; and
a data path interface device coupled between the line interface unit and the digital signal processor and operable to facilitate an interface therebetween, the data path interface device comprising a synchronizer operable to receive the multiframe synchronization signal from the line interface unit, the multiframe synchronization signal being a predetermined portion of the incoming signal, the synchronizer further operable to generate a transmitted multiframe synchronization signal in response to the received multiframe synchronization signal, the transmitted multiframe synchronization signal identifying a signaling frame for insertion of signaling information in the processed signal to reduce signaling noise.

15. The communication system of claim 14, wherein the digital signal processor comprises an echo canceler operable to receive and perform echo cancellation on the framed incoming signal.

16. The communication system of claim 14, wherein the synchronizer comprises a delay generator, the delay generator operable to generate the transmitted multiframe synchronization signal by introducing a delay in the received multiframe synchronization signal in response to a delay in the data path of the incoming signal through the digital signal processor.

17. The communication system of claim 16, wherein the delay generator comprises a delay memory, the delay memory operable to store a user-programmable delay value, the delay generator operable to generate the transmitted multiframe synchronization signal in response to the user-programmable delay value.

18. The communication system of claim 14, wherein the data path interface device comprises an idle code detector operable to receive the framed incoming signal and to detect an idle code present in the incoming signal.

19. The communication system of claim 18, wherein the idle code detector comprises an idle code memory operable to store at least one user-programmable idle code pattern, the idle code detector operable to detect an idle code present in the incoming signal in response to the user-programmable idle code pattern.

20. The communication system of claim 14, wherein the data path interface device comprises a least significant bit detector operable to receive the framed incoming signal and to detect a loss of information in the incoming signal.

21. The communication system of claim 14, wherein the data path interface device comprises a data monitoring unit operable to receive the framed incoming signal and to detect an idle code present in the incoming signal, the data monitoring unit further operable to detect a loss of information in the incoming signal.

22. The communication system of claim 21, wherein the data path interface device comprises a daughter card interface operable to facilitate an interface between the data path interface device and a daughter card.

23. The communication system of claim 14, wherein the data path interface device comprises a daughter card interface operable to facilitate an interface between the data path interface device and a daughter card.

24. The communication system of claim 23, wherein the daughter card interface comprises a multiplexer operable to receive and concatenate signals containing N-bit words to form concatenated signals containing 2N-bit words, the daughter card interface further operable to transmit the concatenated signals to the daughter card.

25. The communication system of claim 14, wherein the data path interface device comprises an analog phase locked loop operable to generate timing and synchronization signals for use within the data path interface device and for interfacing to external devices.

26. A method of providing enhanced voice services, comprising:
   receiving an incoming signal;
   extracting synchronization information from the incoming signal;
   generating a processed signal from the incoming signal;
   identifying a signalling frame in the processed signal in response to the synchronization information; and
   inserting a signaling bit into the identified signaling frame of the processed signal.

27. The method of claim 26, wherein generating a processed signal from the incoming signal includes performing echo cancellation.

28. The method of claim 26, wherein the step of identifying a signaling frame in the processed signal includes introducing a delay in a multiframe synchronization signal carrying the synchronization information in response to a delay in the data path of the incoming signal through a digital signal processor.

29. The method of claim 28, wherein identifying a signaling frame in the processed signal includes introducing a user-programmable delay value in the multiframe synchronization signal.

30. The method of claim 26, further comprising:
   detecting an idle code in the incoming signal.

31. The method of claim 30, wherein detecting an idle code includes comparing the incoming signal with a user-programmable idle code pattern.

32. The method of claim 31, further comprising:
   masking the incoming signal with an idle mask pattern to generate a masked incoming signal; and
   comparing the masked incoming signal with a user-programmable idle code pattern.

33. The method of claim 31, further comprising:
   masking the user-programmable idle code pattern with an idle code mask to generate a masked user-programmable idle code pattern; and
   comparing the incoming signal to the masked user-programmable idle code pattern.

34. The method of claim 26, further comprising:
   detecting a loss of information in the incoming signal.

35. The method of claim 34, wherein detecting a loss of information in the incoming signal includes determining the status of the least significant bit of each incoming signal.

36. The method of claim 26, further comprising:
   detecting idle code present in the incoming signal; and
   detecting a loss of information in the incoming signal.

37. The method of claim 36, further comprising:
   facilitating an interface between a data path interface device and a daughter card.

38. The method of claim 26, further comprising:
   facilitating an interface between a data path interface device and a daughter card.

39. The method of claim 38, wherein facilitating an interface between a data path interface device and a daughter card includes:
   concatenating signals containing N-bit words to form concatenated signals containing 2N-bit words; and
   transmitting the concatenated signals to the daughter card.

40. The method of claim 26, further comprising:
   generating timing and synchronization signals for use within a data path interface device and for interfacing devices external to the data path interface device.

41. A data path interface device for receiving an incoming signal and facilitating an interface to a digital signal processor, the data path interface device comprising:
   an idle code detector operable to detect an idle code present in the incoming signal by comparing the incoming signal to at least one user-programmable idle code pattern, the idle code detector operable to initiate disablement of incoming signal processing in response to detection of the idle code in the incoming signal.

42. The data path interface device of claim 41, wherein the digital signal processor comprises an echo canceler operable to receive and perform echo cancellation on the incoming signal.

43. The data path interface device of claim 41, further comprising a least significant bit detector operable to detect a loss of information in the incoming signal by monitoring the status of the least significant bit of each channel of the incoming signal to determine whether that bit is stuck at a particular value.

44. The data path interface device of claim 41, further comprising a daughter card interface operable to facilitate an interface between the data path interface device and a daughter card.

45. The data path interface device of claim 44, wherein the daughter card interface comprises a multiplexer operable to receive and concatenate signals containing N-bit words to form concatenated signals containing 2N-bit words, the daughter card interface further operable to transmit the concatenated signals to the daughter card.

46. The data path interface device of claim 44, further comprising a least significant bit detector operable to detect a loss of information in the incoming signal by monitoring the least significant bit of each channel of the incoming signal to determine whether that bit is stuck at a particular value.

47. A communication system for providing enhanced voice services comprising:

a line interface unit operable to receive and frame an incoming signal;

a digital signal processor operable to receive and process the framed incoming signal; and a data path interface device coupled between the line interface unit and digital signal processor operable to facilitate an interface therebetween, the data path interface comprising an idle code detector operable to detect an idle code present in the incoming signal by comparing the incoming signal to at least one user-programmable idle code pattern, the idle code detector operable to initiate disablement of incoming signal processing in response to detection of the idle code in the incoming signal.

48. The communication system of claim 47, wherein the digital signal processor comprises an echo canceler operable to receive and perform echo cancellation on the framed incoming signal.

49. The communication system of claim 47, wherein the data path interface device comprises a least significant bit detector operable to detect a loss of information in the incoming signal by monitoring the least significant bit of each channel of the incoming signal to determine whether that bit is stuck at a particular value.

50. The communication system of claim 47, wherein the data path interface device comprises a daughter card interface operable to facilitate an interface between the data path interface device and a daughter card.

51. The communication system of claim 50, wherein the daughter card interface comprises a multiplexer operable to receive and concatenate signals containing N-bit words to form concatenated signals containing 2N-bit words, the daughter card interface further operable to transmit the concatenated signals to the daughter card.

52. The communication system of claim 50, wherein the data path interface device comprises a least significant bit detector operable to detect a loss of information in the incoming signal by monitoring the least significant bit of each channel of the incoming signal to determine whether that bit is stuck at a particular value.

53. The communication system of claim 47, wherein the data path interface device comprises an analog phase locked loop operable to generate timing and synchronization signals for use within the data path interface device and for interfacing to external devices.

54. A method of providing enhanced voice services comprising the steps of:

framing an incoming signal;

processing the incoming signal;

detecting an idle code in the incoming signal by comparing the incoming signal to at least one user-programmable idle code; and disabling incoming signal processing in response to detection of the idle code in the incoming signal.

55. The method of claim 54, wherein the step of processing the incoming signal comprises the step of canceling an echo in the incoming signal.

56. The method of claim 54, further comprising the steps of:

masking the incoming signal with an idle mask pattern to generate a masked incoming signal; and comparing the masked incoming signal with a user-programmable idle code pattern.

57. The method of claim 54, further comprising the steps of:

masking the user-programmable idle code pattern with an idle code mask to generate a masked user-programmable idle code pattern; and comparing the incoming signal to the masked user-programmable idle code pattern.

58. The method of claim 54, further comprising the step of detecting a loss of information in the incoming signal by monitoring the least significant bit of each channel of the incoming signal to determine whether that bit is stuck at a particular value.

59. The method of claim 54, further comprising the step of facilitating an interface between a data path interface device and a daughter card.

60. The method of claim 59, wherein the step of facilitating an interface between a data path interface device and a daughter card comprises the steps of:

concatenating signals containing N-bit words to form concatenated signals containing 2N-bit words; and transmitting the concatenated signals to the daughter card.

61. The method of claim 59, further comprising the step of detecting a loss of information in the incoming signal by monitoring the least significant bit of each channel of the incoming signal to determine whether that bit is stuck at a particular value.

62. The method of claim 54, further comprising the step of generating timing and synchronization signals for use within a data path interface device and for interfacing devices external to the data path interface device.

63. A data path interface device for receiving an incoming signal and facilitating an interface to a digital signal processor, the data path interface device comprising:

a daughter card interface operable to facilitate an interface to a daughter card, the daughter card interface comprising a multiplexer operable to receive and concatenate signals containing N-bit words to form concatenated signals containing 2N-bit words, the daughter card interface further operable to transmit the concatenated signals to the daughter card, the daughter card interface operable to bypass the N-bit words away from the multiplexer in response to an indication that no further signal processing is desired for the N-bit words.

64. The data path interface device of claim 63, wherein the digital signal processor comprises an echo canceler operable to receive and perform echo cancellation on the incoming signal.

65. The data path interface device of claim 63, further comprising an analog phase locked loop operable to generate timing and synchronization signals for use within the data path interface device and for interfacing to external devices.

66. A communication system for providing enhanced voice services comprising:
- a line interface unit operable to receive and frame an incoming signal;
- a digital signal processor operable to receive and process the framed incoming signal; and
- a data path interface device coupled between the line interface unit and digital signal processor operable to facilitate an interface therebetween, the data path interface comprising a daughter card interface operable to facilitate an interface to a daughter card, the daughter card interface comprising a multiplexer operable to receive and concatenate signals containing N-bit words to form concatenated signals containing 2N-bit words, the daughter card interface further operable to transmit the concatenated signals to the daughter card, the daughter card interface operable to bypass the N-bit words away from the multiplexer in response to an indication that no further signal processing is desired for the N-bit words.

67. The communication system of claim 66, wherein the digital signal processor comprises an echo canceler operable to receive and perform echo cancellation on the framed incoming signal.

68. The communication system of claim 66, wherein the data path interface device comprises an analog phase locked loop operable to generate timing and synchronization signals for use within the data path interface device and for interfacing to external devices.

69. A method of providing enhanced voice services comprising:
- framing an incoming signal;
- processing the incoming signal; and
- concatenating signals containing N-bit words to form concatenated signals containing 2N-bit words;
- transmitting the concatenated signals to a daughter card; and
- bypassing the N-bit words to avoid concatenation and transmission in response to an indication that no further signal processing is to be performed on the N-bit words.

70. The method of claim 69, wherein processing the incoming signal includes cancelling an echo in the incoming signal.

71. The method of claim 69, further comprising:
- generating timing and synchronization signals for use within a data path interface device and for interfacing devices external to the data path interface device.

72. A communication system for providing enhanced voice services comprising:
- a line interface unit operable to receive and frame an incoming signal;
- a digital signal processor operable to receive and process the framed incoming signal; and
- a data path interface device coupled between the line interface unit and digital signal processor operable to facilitate an interface therebetween, the data path interface device comprising:
  - a synchronizer operable to receive a multiframe synchronization signal from the line interface unit, the multiframe synchronization signal being a predetermined portion of he incoming signal, the synchronizer further operable to generate a transmitted multiframe synchronization signal in response to the multiframe synchronization signal received, the transmitted multiframe synchronization signal operable to define a signaling frame in the processed signal to reduce signaling noise;
  - an idle code detector operable to detect an idle code present in the incoming signal by comparing the incoming signal to at least one user-programmable idle code pattern;
  - a least significant bit detector operable to detect a loss of information in the incoming signal by monitoring the least significant bit of each channel of the incoming signal to determine whether that bit is stuck at a particular value; and
  - a data path interface device operable to facilitate an interface between the line interface device and the digital signal processor, the data path interface comprising a daughter card interface operable to facilitate an interface to a daughter card, the daughter card interface comprising a multiplexer operable to receive and concatenate signals containing N-bit words to form concatenated signals containing 2N-bit words, the daughter card interface further operable to transmit the concatenated signals to the daughter card.

* * * * *